United States Patent
Chiu et al.

(10) Patent No.: US 7,995,908 B2
(45) Date of Patent: Aug. 9, 2011

(54) IMAGE STABILIZING CAMERA SYSTEM

(75) Inventors: Chi-Wei Chiu, Taipei Hsien (TW); Shun-Fan Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/650,802

(22) Filed: Dec. 31, 2009

(65) Prior Publication Data

US 2011/0019985 A1 Jan. 27, 2011

(30) Foreign Application Priority Data

Jul. 27, 2009 (CN) .......................... 2009 1 0304870

(51) Int. Cl.
*G02B 27/62* (2006.01)
(52) U.S. Cl. ..................................... 396/55; 348/208.11
(58) Field of Classification Search .................... 396/55; 348/208.7, 208.11
See application file for complete search history.

(56) References Cited

U.S. PATENT DOCUMENTS

| | | | |
|---|---|---|---|
| 5,745,800 A * | 4/1998 | Kanbara et al. | 396/55 |
| 6,539,174 B1 * | 3/2003 | Tanii et al. | 396/55 |
| 7,375,905 B2 * | 5/2008 | Jin | 359/726 |
| 2004/0141065 A1 * | 7/2004 | Hara et al. | 348/208.11 |
| 2006/0033818 A1 * | 2/2006 | Wada et al. | 348/208.11 |
| 2006/0257128 A1 * | 11/2006 | Ishito et al. | 396/55 |

* cited by examiner

*Primary Examiner* — Clayton E Laballe
*Assistant Examiner* — Leon W Rhodes
(74) *Attorney, Agent, or Firm* — Raymond J. Chew (57) ABSTRACT

An exemplary image stabilizing camera system includes a fixed body having a first receiving cavity therein, a movable unit received in the first receiving cavity, a pivot member located between the fixed body and the movable unit, a motion sensor, and a driving module. The pivot member is engagingly received in and between the fixed body and the movable unit. The motion sensor is disposed on the fixed body and configured for detecting a movement of the image stabilizing camera system. The driving module is configured for driving the movable unit to rotate around the pivot member to compensate a movement of the image stabilizing camera system based on the motion detection result of the motion sensor.

20 Claims, 5 Drawing Sheets

IMAGE STABILIZING CAMERA SYSTEM

BACKGROUND

1. Technical Field

The present disclosure relates to camera systems, and particularly to an anti-vibration camera system.

2. Description of Related Art

In normal use of a camera, light rays from an object transmit into the camera and fall on a particular region of an image sensor. The image sensor forms an optical image associated with the object at a first position.

However, camera-shake due to hand-held shooting during optical image capture can result in the camera moving slightly relative to the object. Consequently, light rays from the object may fall on a different region of the image sensor causing the optical image associated with the object at a second position to form a blurry optical image. Current image stabilizing camera systems that deal with this problem are expensive and complicated.

Therefore, a new image stabilizing camera system is desired to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Referring to FIGS. 1-5, an image stabilizing camera system 100, in accordance with a first embodiment, is shown. The system 100 includes a fixed body 110, a movable unit 120, an auto-focus (AF) unit 130, an image sensor 140, a pivot member 150, an elastic member 160, a motion sensor 170, and a drive module 180.

Figure 1:
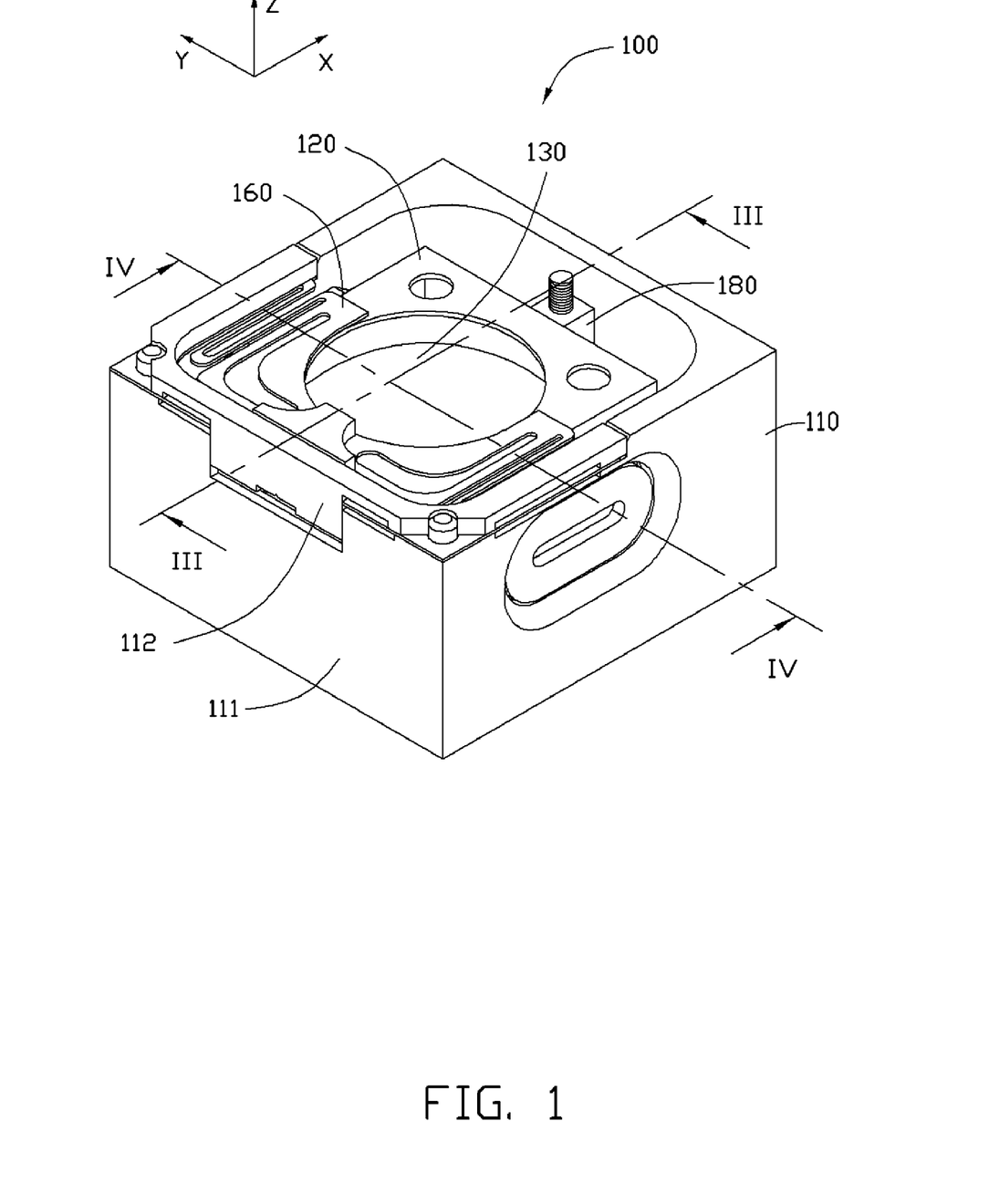
FIG. 1 is an isometric view of an image stabilizing camera system according to a first embodiment.
Figure 2:
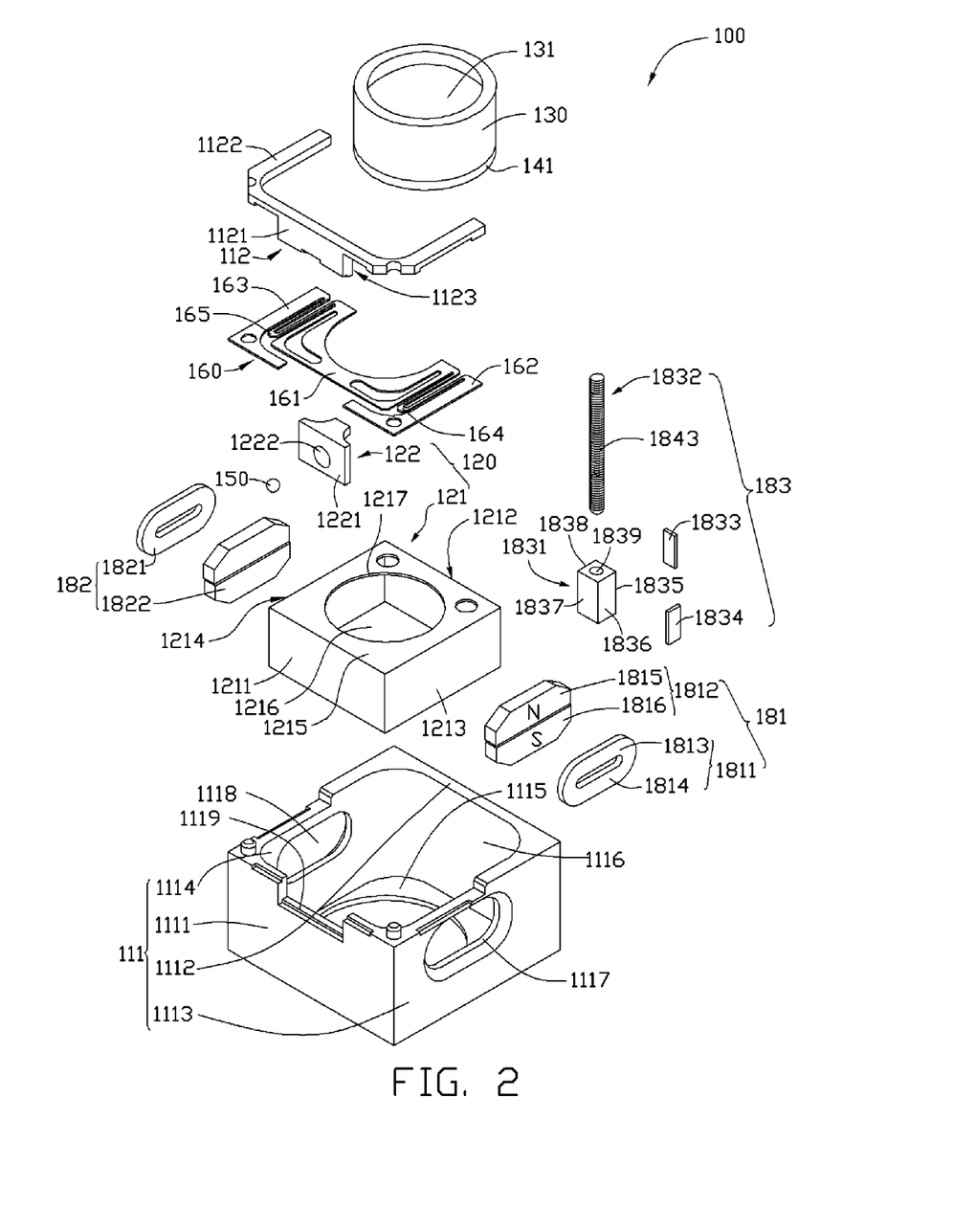
FIG. 2 is an exploded, isometric view of the stabilizing camera system of FIG. 1.

The fixed body 110 is substantially cubic. The fixed body 110 is securely mounted on a main body (not shown) of the system 100. The fixed body 110 includes a main frame 111 and an attachable frame 112.

The main frame 111 is substantially cubic, and includes a first sidewall 1111, a second sidewall 1112 opposite to the first sidewalls 1111, a third sidewall 1113, a fourth sidewall 1114 opposite to the third sidewall 1113, and a bottom plate 1115. The four sidewalls 1111, 1112, 1113, and 1114 are fastened to one another by a dovetail panel joint. The bottom plate 1115 is substantially square, and is perpendicular to the four sidewalls 1111, 1112, 1113, and 1114. Four sides of the bottom plate 1115 are respectively fastened to the four sidewalls 1111, 1112, 1113, and 1114 by dovetail panel joints. The bottom plate 1115 and the four sidewalls 1111, 1112, 1113, and 1114 cooperatively define a first receiving cavity 1116 for receiving the movable unit 120 therein. The third sidewall 1113 defines a first receiving hole 1117 at the center thereof. The fourth sidewall 1114 defines a second receiving hole 1118 at the center thereof. An end surface of the first sidewall 1111 far away from the bottom plate 1115 defines a first receiving recess 1119 for receiving the attachable frame 112 therein. In other embodiments, the fixed body 110 may instead be any other shape, such as cylindrical, pentagonal prismatic etc.

The attachable frame 112 is substantially U-shaped. The attachable frame 112 is configured for receiving the pivot member 150 therein. The attachable frame 112 includes a vertical plate 1121, and a U-shaped plate 1122 perpendicular to the side plate 1121. The plate 1121 is securely mounted in the recess 1119. The plate 1121 has an inner surface 1123 facing the first receiving cavity 1116. The inner surface 1123 defines a first receiving portion 1124 (see FIG. 3) for receiving the pivot member 150 therein. The plate 1122 is securely mounted on the first, third, and fourth sidewalls 1111, 1112, and 1113. In the present embodiment, the first receiving portion 1124 is a recess. In other embodiments, the first receiving portion 1124 may be a through hole. In a further embodiment, the pivot member 150 may instead be partially received the first side wall 1111 therein.

The movable unit 120 is substantially cubic, and received in the first receiving cavity 1116. The movable unit 120 is configured for receiving the AF unit 130 therein. The movable unit 120 includes a movable frame 121, and a receiving member 122 securely mounted on the movable frame 121.

The movable frame 121 is substantially cubic, and includes a first side plate 1211, a second side plate 1212 opposite to the first side plate 1211, a third side plate 1213, a fourth side plate 1214 opposite to the third side plate 1213, and a top plate 1215. The four plates 1211, 1212, 1213, and 1214 are fastened to one another by a dovetail panel joint. The top plate 1215 is substantially square, and is perpendicular to the four plates 1211, 1212, 1213, and 1214. The four sides of the top plate 1215 are respectively fastened to the four plates 1211, 1212, 1213, and 1214 by dovetail panel joints, such that the top plate 1215 and the four plates 1211, 1212, 1213, and 1214 cooperatively define a second receiving cavity 1216 for receiving the AF unit 130 therein. The top plate 1215 defines a through hole 1217 at the center thereof. The through hole 1217 allows light to pass the top plate 1215. In other embodiments, the movable unit 120 may instead be any other shape, such as cylindrical, pentagonal prismatic etc.

Figure 3:
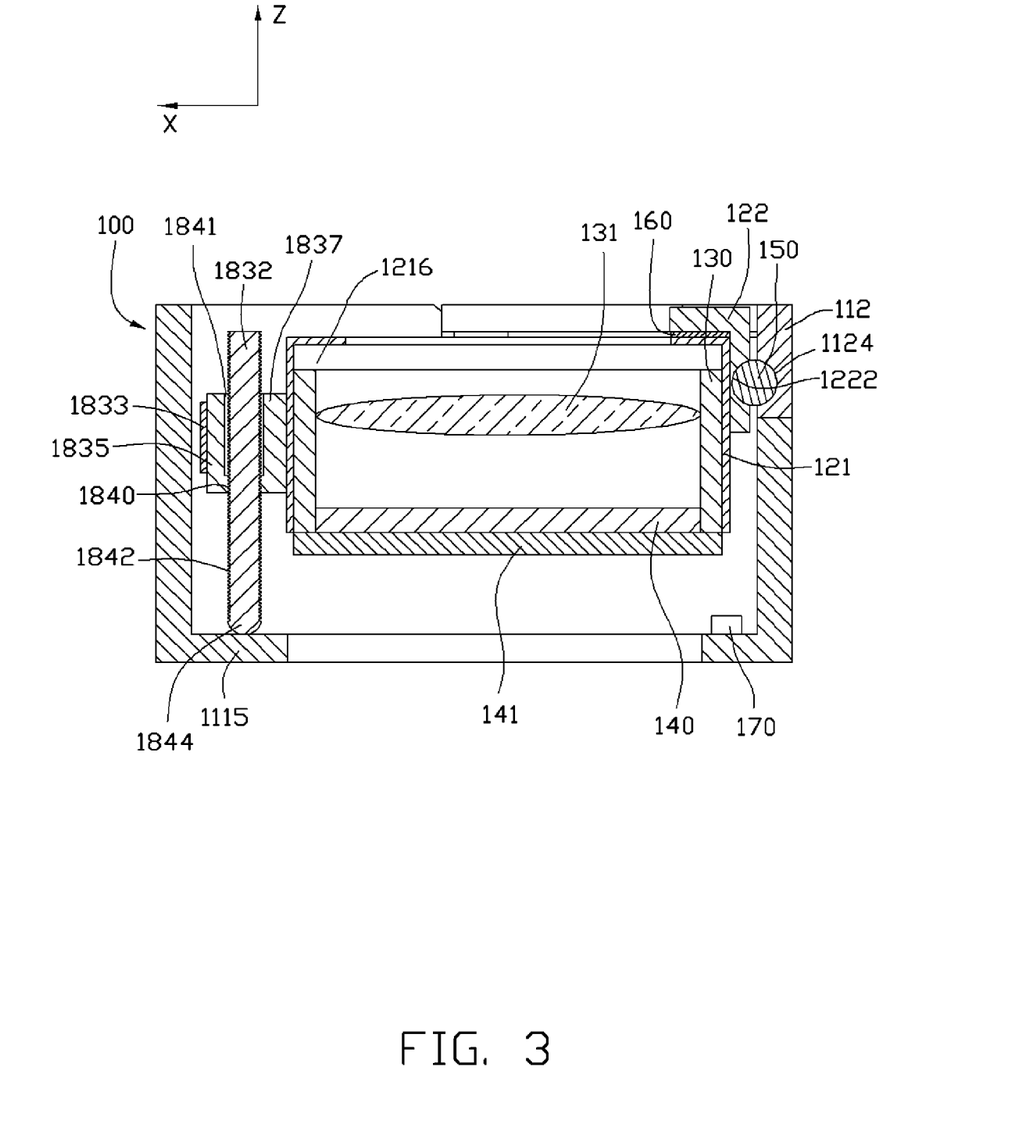
FIG. 3 is a cross-sectional view of the stabilizing camera system of FIG. 1, taken along a line III-III thereof.

The receiving member 122 is configured for partially receiving the pivot member 150 therein. The receiving member 122 is disposed between the vertical plate 1121 and the first side plate 1211, and is spaced from the vertical plate 1211. The receiving member 122 has an outer surface 1221 facing the inner surface 1123. The outer surface 1221 defines a second receiving portion 1222 for partially receiving the pivot member 150 therein. In the present embodiment, the second receiving portion 1222 is a recess. In other embodiments, the second receiving portion 1222 may be a through hole. In a further embodiment, the receiving member 122 may be omitted. In such case, the pivot member 150 can be partially received in the first side plate 1211 therein.

The AF unit 130 is securely mounted on the movable frame 121. The AF unit 130 includes a lens 131, and an auto-focus actuator (not shown) for driving the lens 131 to move along an optical axis (not shown) of the lens 131 for focusing.

The image sensor 140 is electrically connected to a printed circuit board 141 securely mounted on the bottom end of the AF unit 130, and is surrounded by the movable frame 121. The image sensor 140 is configured for converting an optical image to an electrical signal. In other embodiment, the image sensor 140 may instead be securely mounted on the bottom plate 1115. That is, the printed circuit board 141 may instead be securely mounted atop the bottom plate 1115.

The pivot member 150 is engagingly received in and between the first receiving portion 1124 and the second receiving portion 1222, such that the movable frame 121, driven by the driving module 180, can rotate around the pivot member 150 relative to the main frame 111. In the present embodiment, the pivot member 150 is a ball, and the movable unit 130 can rotate around both the X axis and Y axis. In other embodiments, the pivot member 150 may instead be a shaft, such that the movable unit 130 can only rotate around the X axis, or only rotate around the Y axis.

The elastic member 160 is configured for providing an elastic restoring force to make the movable unit 120 coaxial to the fixed body 110. The elastic member 160 is disposed between the main and attachable frames 111, 112. The elastic member 160 includes a first fixed portion 161, a second fixed portion 162, a third fixed portion 163, a first elastic connecting portion 164 connecting the first fixed portion 161 to the second fixed portion 162, and a second elastic connecting portion 165 connecting the first fixed portion 161 to the third fixed portion 163. The first fixed portion 161 is adhesively mounted on the top plate 1215. The second and third fixed portions 162, 163 are securely mounted on the third and fourth sidewalls 1113, 1114, thereby making the first and second elastic connecting portions 164. 165 be interposed between the fixed body 110 and the movable unit 120. In alternative embodiments, the second and third fixed portions 162, 163 may instead be securely adhered on the top surface of the U-shaped plate 1122. In other alternative embodiments, the elastic member 160 may instead be a spring. In such case, the number of the elastic member 160 may be two, three, and so on.

The motion sensor 170 is disposed on the bottom plate 1115, and is configured for sensing a movement of the system 100 (i.e., a movement of the main frame 111). The motion sensor 170 can be a gyro sensor.

Figure 5:
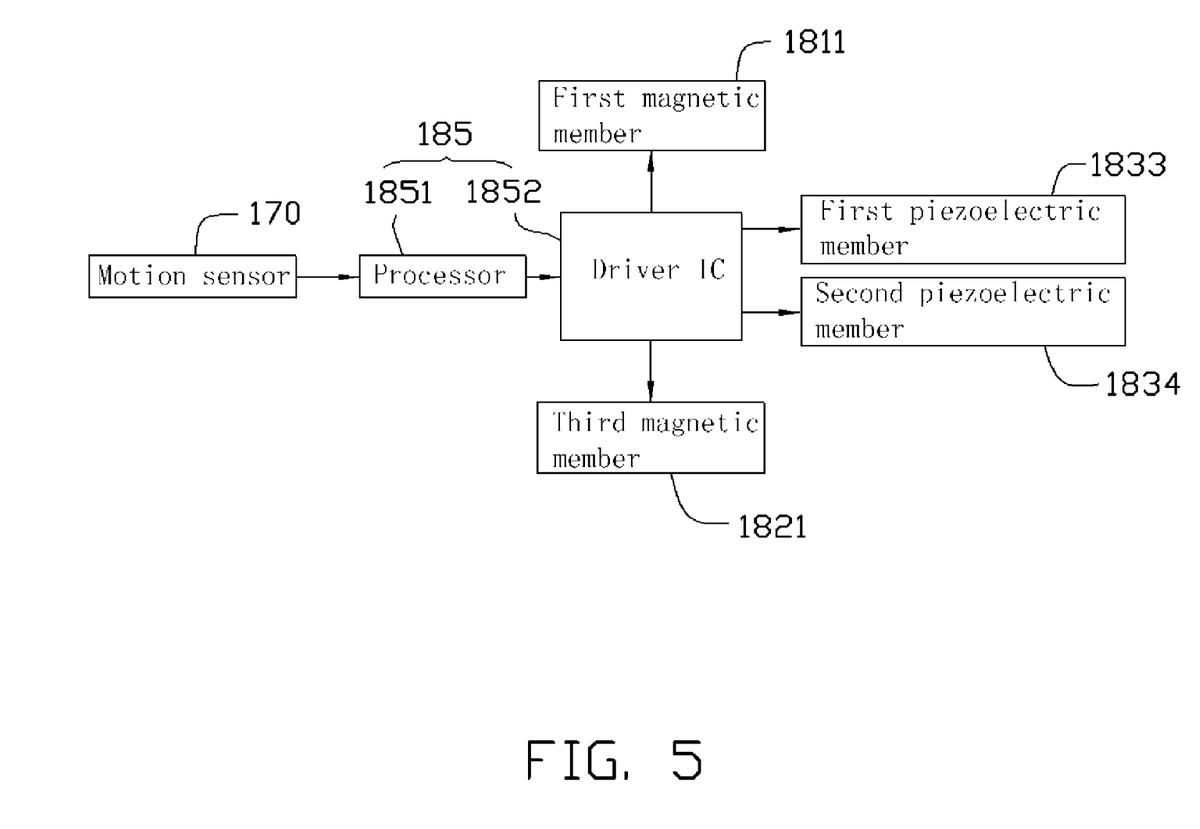
FIG. 5 is a block diagram showing a relationship between a motion sensor, a drive unit, a first magnetic member, a third magnetic member, a first piezoelectric member, and a second piezoelectric member of the stabilizing camera system of FIG. 1.

The driving module 180 is configured for driving the AF unit 130 (i.e., the movable unit 120) to move relative to the main frame 111 to compensate for movements of the system 100 based on/associated with a motion detection result/signals of the motion sensor 170, thereby eliminating/reducing blur. The driving module 180 includes a first electromagnetic driving unit 181, a second electromagnetic driving unit 182, a piezoelectric driving unit 183, and a control circuit 185.

Figure 4:
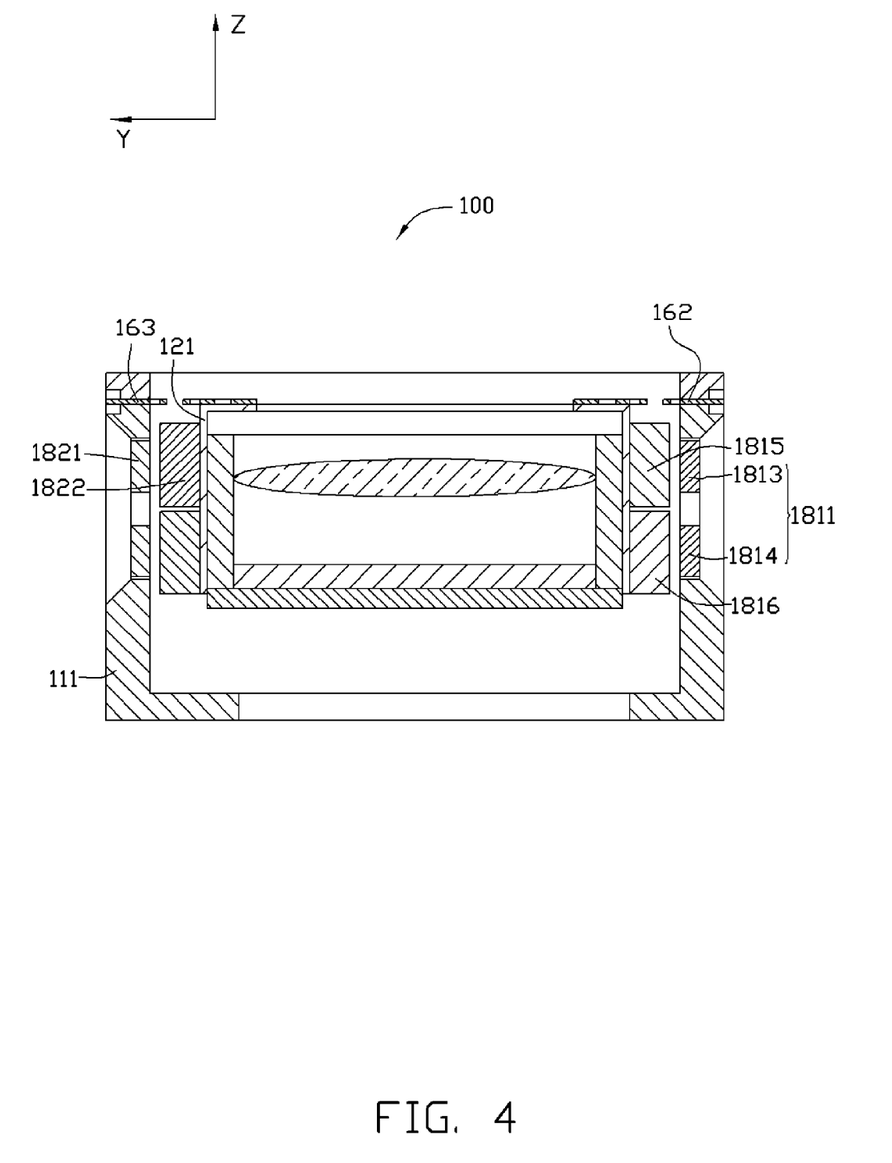
FIG. 4 is a cross-sectional view of the stabilizing camera system of FIG. 1, taken along a line IV-IV thereof.

The first electromagnetic driving unit 181 is configured for driving the AF unit 130 to rotate around X axis relative to the main frame 111. The first electromagnetic driving unit 181 includes a first magnetic member 1811 received in the first receiving hole 1117, and a second magnetic member 1812 securely mounted on the third side plate 1213. The first magnetic member 1811 is opposite to the second magnetic member 1812. At least one of the first and the second magnetic members 1811, 1812 is electromagnetic so that a magnetic force generated between the first and the second magnetic members 1811, 1812 is controllable by the control circuit 185.

In the present embodiment, the first magnetic member 1811 is a coil (e.g., electromagnetic member), and includes an upper portion 1813 and a lower portion 1814. The second magnetic member 1812 includes an upper magnet 1815 spatially corresponding to the upper portion 1813, and a lower magnet 1816 spatially corresponding to the lower portion 1814. The S magnetic pole of the upper magnet 1815 faces the third side plate 1213, and the N magnetic pole of the upper magnet 1815 faces away from the third side plate 1213. The N magnetic pole of the lower magnet 1816 faces the third side plate 1213, and the S magnetic pole of the lower magnet 1816 faces away from the third side plate 1213 or vice versa in other embodiments.

The second electromagnetic driving unit 182 is configured for driving the AF unit 130 to rotate around the X axis relative to the main frame 111, and is similar to the first electromagnetic unit 181. The second electromagnetic driving unit 182 includes a third magnetic member 1821 received in the second receiving hole 1118, and a fourth magnetic member 1822 securely mounted on the fourth side plate 1214. The third magnetic member 1821 is opposite to the fourth magnetic member 1822. At least one of the third and fourth magnetic members 1821, 1822 is electromagnetic so that a magnetic force between the third and fourth magnetic members 1821, 1822 is controllable by the control circuit 185.

The piezoelectric driving unit 183 is configured for driving the movable unit 130 to rotate around the Y axis relative to the main frame 111. The piezoelectric driving unit 183 is located between the second sidewalls 1112 and the second side plate 1212. The piezoelectric driving 183 includes a hollow connecting body 1831, a threaded shaft 1832, and two piezoelectric members 1833, 1834.

The connecting body 1831 is substantially cubic, and includes a first outer surface 1835, a second outer surface 1836 perpendicular to the first outer surface 1835, a third outer surface 1837 parallel with the first outer surface 1835, and a fourth outer surface 1838 perpendicular to the first outer surface 1835. The first outer surface 1835 is spaced from the third sidewall 1112. The third outer surface 1837 is securely attached to the second side plate 1212.

The connecting body 1831 also has a stepped hole 1839 defined at the center thereof for allowing the threaded shaft 1832 to insert through the connecting body 1831. The stepped hole 1839 includes a first hole 1840 with a first diameter, and a second hole 1841 with a second diameter. The second diameter is larger than the first diameter. The first hole 1840 is in communication with the second hole 1841. An inner thread 1842 is formed on an inner wall of the first hole 1840 of the connecting body 1831.

The threaded shaft 1832 has an outer thread 1843 formed on an outer surface thereof. The threaded shaft 1832 is for engaging with the inner thread 1842 of the connecting body 1831. The thread shaft 1832 also has a hemispheric end 1844 supported by the bottom plate 1115.

The two piezoelectric members 1833, 1834 are substantially rectangular, and securely attached to the first and second outer surfaces 1835, 1836. When the two piezoelectric members 1833, 1834 are alternately supplied a voltage controlled by the control circuit 185, the two piezoelectric members 1833, 1834 alternately deform due to the alternate voltage applied thereto, thereby causing the threaded shaft 1832 to rotate. The rotating threaded shaft 1832 causes the connecting body 1831 to move along the threaded shaft 1832, thereby driving the movable frame 121 rotate around the Y axis. In the present embodiment, the two piezoelectric members 1833, 1834 are piezoelectric plates. In other present embodiment, the two piezoelectric members 1833, 1834 may instead be piezoelectric stacks.

The control circuit 185 includes a processor 1851 and a driver integrated circuit (IC) 1852 electrically connected with the processor 1851. The processor 1851 is electrically connected with the motion sensor 170. The driver IC 1852 is electrically connected with the first magnetic member 1811, a third magnetic member 1821, and the two piezoelectric members 1833, 1834. The processor 1851 can be, for example, a digital signal processor (DSP) position controller.

In operation, at the beginning of capturing an image with the system 100, the elastic members 160 are in a normal state; the bottom plate 1115 is parallel to the top plate 1215; and there is no power supplied to the first magnetic member 1811, a third magnetic member 1821, and the two piezoelectric members 1833, 1834. At this moment, the system 100 forms an image associated with an object (not shown) on a first position of the image sensor 140.

While the image is captured, the system 100 could shake due to hand-held shooting. The shaking may cause the system 100 to rotate clockwise around the Y axis relative to the object, for example. Accordingly, the image sensor 140 and the AF unit 130 are rotated with the system 100. The motion sensor 170 detects a movement of the system 100 and sends a motion detection result to the processor 1851. Based on the motion detection result, the processor 1851 computes a compensating adjustment for the AF unit 130 in order to reposition the image on the first position of the image sensor 140. For example, the AF unit 130 may need to rotate the computed compensating angle anti-clockwise around the Y axis. The processor 1851 then sends a signal to the driver IC 1852, and the driver IC 1852 alternately applies voltages to the two piezoelectric members 1833, 1834 in response to the signal, such that the two piezoelectric members 1833, 1834 alternately deform.

Hence, the movable unit 120 together with the AF unit 130 are anti-clockwise rotated the predetermined angle around the Y axis, the first and second elastic connecting portions 164, 165 adjacent to the movable unit 130 become stretched. As a result, the system 100 forms an image associated with the object (not shown) on the first position of the image sensor 140. That is, the image of the object is formed on the same position of the image sensor 140 before and while the system 100 is shaken. Consequently, a stabilized image of the object following a system 100 shake still results in a substantially identical image capture as a non-shake of the same. Accordingly, a blurred image is avoided. In addition, the drive module 180 of the system 100 applies magnetic forces to drive the movable unit 20 to rotate around the pivot member 150, and the control of the magnetic forces is easier. Therefore, the drive module 180 is simpler, and the system 100 is accordingly simpler, too. Therefore, the cost of the system 100 is lower.

After capturing the stabilized image of the object, even though the driver IC 1852 may stop supplying voltages to the two piezoelectric members 1833, 1834, the elastic restoring forces generated by the deformations of the first and second elastic connecting portion 164, 165, can drive the movable unit 120 to be coaxial to the fixed body 110.

It is to be understood that when the system 10 shakes, the system 100 may be only rotated around the X axis. In such circumstances, the first magnetic member 1811, the third magnetic member 1821, or the first and third magnetic 1811, 1812 should and can be activated to adjust the position of the movable unit 120.

It is also to be understood that when the system 10 shakes, the system 100 may be rotated around both the X axis and the Y axis. In these circumstances, the first magnetic member 1811, a third magnetic member 1821, and the two piezoelectric members 1833, 1834 should be activated to adjust a position of the movable unit 120.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. An image stabilizing camera system comprising:
   a fixed body, the fixed body having a first receiving cavity therein and an inner surface facing to the first receiving cavity, the inner surface having a first receiving portion therein, the fixed body comprising a bottom plate;
   a movable unit received in the first receiving cavity, the movable unit having an outer surface facing to the inner surface, the outer surface having a second receiving portion therein;
   a pivot member located between the fixed body and the movable unit, the pivot member being engagingly received in and between the first receiving portion and the second receiving portion;
   a motion sensor disposed on the fixed body and configured for detecting a movement of the image stabilizing camera system; and
   a driving module configured for driving the movable unit to rotate around the pivot member to compensate a movement of the image stabilizing camera system based on a motion detection result of the motion sensor, the driving module comprising a piezoelectric driving unit disposed between the fixed body and the movable unit, and a control circuit, the piezoelectric driving unit comprising a hollow connecting body mounted on the movable unit, a threaded shaft threadedly engaged with the hollow connecting body, and two piezoelectric members mounted on the hollow connecting body, the threaded shaft comprising an end supported by the bottom plate, the two piezoelectric members being spaced from each other, and both spaced from the fixed body, the control circuit being configured for alternately applying voltages to the two piezoelectric members to alternately deform the two piezoelectric members.

2. The camera system of claim 1, wherein the pivot member comprises a ball, or a rotation shaft.

3. The camera system of claim 1, wherein the driving module comprises a electromagnetic driving unit, the electromagnetic driving unit comprises an electromagnetic member disposed on the fixed body, and further comprises a magnetic member mounted on the movable unit, the electromagnetic member is opposite to the magnetic member, and the control circuit is configured for controlling a magnetic force generated between the electromagnetic member and the magnetic member.

4. The camera system of claim 3, wherein the electromagnetic member comprises a coil, the coil comprises an upper portion, and a lower portion, and the magnetic member comprises an upper magnet spatially corresponding to the upper portion; and a lower magnet spatially corresponding to the lower portion.

5. The camera system of claim 4, wherein the S magnetic pole of the upper magnet faces the movable unit, the N magnetic pole of the upper magnet faces away from the movable unit, the N magnetic pole of the lower magnet faces the movable unit, and the S magnetic pole of the lower magnet faces away from the movable unit.

6. The camera system of claim 3, wherein the control circuit comprises a processor and a driver IC electrically connected with the processor, the processor is electrically connected with the motion sensor, and the driver IC is electrically connected with the electromagnetic member.

7. The camera system of claim 1, wherein the control circuit comprises a processor and a driver IC electrically connected with the processor, the processor is electrically connected with the motion sensor, and the driver IC is electrically connected with the two piezoelectric members.

8. The camera system of claim 1, wherein the movable unit comprises a movable frame, and a receiving member mounted on the movable frame, the second receiving portion is defined in the receiving member.

9. The camera system of claim 1, further comprising an elastic member for providing an elastic restoring force, the elastic member is interposed between the fixed body and the movable unit.

10. An image stabilizing camera system for capturing an image of an object, the image stabilizing camera system comprising:
  a fixed body, the fixed body having a first receiving cavity therein and an inner surface facing to the first receiving cavity, the inner surface having a first receiving portion therein, the fixed body comprising a bottom plate;
  a movable unit received in the first receiving cavity, the movable unit having an outer surface facing to the inner surface, the outer surface having a second receiving portion therein;
  an image sensor received in the fixed body;
  a pivot member located between the fixed body and the movable unit, the pivot member being engagingly received in and between the first receiving portion and the second receiving portion;
  a motion sensor disposed on the fixed body and configured for detecting a movement of the image stabilizing camera system; and
  a driving module configured for driving the movable unit rotate around the pivot member to relative to the fixed body, such that the image stabilizing camera system forms an image of the object on an identical position of the image sensor before and after a shake of the image stabilizing camera system, the driving module comprising a piezoelectric driving unit disposed between the fixed body and the movable unit, and a control circuit, the piezoelectric driving unit comprising a hollow connecting body mounted on the movable unit, a threaded shaft threadedly engaged with the hollow connecting body, and two piezoelectric members mounted on the hollow connecting body, the threaded shaft comprising an end supported by the bottom plate, the two piezoelectric members being spaced from each other, and both spaced from the fixed body, the control circuit being configured for alternately applying voltages to the two piezoelectric members to alternately deform the two piezoelectric members.

11. The camera system of claim 10, wherein the pivot member comprises a ball, or a rotation shaft.

12. The camera system of claim 10, wherein the driving module comprises a electromagnetic driving unit, the electromagnetic driving unit comprises an electromagnetic member disposed on the fixed body, and further comprises a magnetic member mounted on the movable unit, the electromagnetic member is opposite to the magnetic member, and the control circuit is configured for controlling a magnetic force generated between the electromagnetic member and the magnetic member.

13. The camera system of claim 12, wherein the electromagnetic member comprises a coil, the coil comprises an upper portion, and a lower portion, and the magnetic member comprises an upper magnet spatially corresponding to the upper portion; and a lower magnet spatially corresponding to the lower portion.

14. The camera system of claim 12, wherein the control circuit comprises a processor and a driver IC electrically connected with the processor, the processor is electrically connected with the motion sensor, and the driver IC is electrically connected with the electromagnetic member.

15. The camera system of claim 10, wherein the control circuit comprises a processor and a driver IC electrically connected with the processor, the processor is electrically connected with the motion sensor, and the driver IC is electrically connected with the two piezoelectric members.

16. The camera system of claim 10, wherein the movable unit comprises a movable frame, and a receiving member mounted on the movable frame, the second receiving portion is defined in the receiving member.

17. The camera system of claim 10, further comprising an elastic member interposed between the fixed body and the movable unit.

18. An image stabilizing camera system for capturing an image of an object, the image stabilizing camera system comprising:
  a fixed body, the fixed body having a first receiving cavity therein and an inner surface facing to the first receiving cavity, the inner surface having a first receiving portion therein, the fixed body comprising a bottom plate;
  a movable unit received in the first receiving cavity, the movable unit having an outer surface facing to the inner surface, the outer surface having a second receiving portion therein;
  an auto-focus unit received in the movable unit;
  an image sensor received in the fixed body;
  a pivot member located between the fixed body and the movable unit, the pivot member being engagingly received in and between the first receiving portion and the second receiving portion;
  a motion sensor disposed on the fixed body and configured for detecting a movement of the image stabilizing camera system; and
  a driving unit configured for driving the movable unit rotate around the pivot member to relative to the fixed body so as to counteract movement of the object relative to the auto-focus unit such that the image stabilizing camera system can, after a shake of the image stabilizing camera system, capture a stabilized image of the object which is substantially identical with an image thereof captured without the shake of the image stabilizing camera system, the driving module comprising a piezoelectric driving unit disposed between the fixed body and the movable unit, and a control circuit, the piezoelectric driving unit comprising a hollow connecting body mounted on the movable unit, a threaded shaft threadedly engaged with the hollow connecting body, and two piezoelectric members mounted on the hollow connecting body, the threaded shaft comprising an end supported by the bottom plate, the two piezoelectric members being spaced from each other, and both spaced from the fixed body, the control circuit being configured for alternately applying voltages to the two piezoelectric members to alternately deform the two piezoelectric members.

19. The image stabilizing camera system of claim 18, wherein the driving module comprises a electromagnetic driving unit, the electromagnetic driving unit comprises an electromagnetic member disposed on the fixed body and further comprises a magnetic member mounted on the movable unit, the electromagnetic member is opposite to the magnetic member, and the control circuit is configured for controlling a magnetic force generated between the electromagnetic member and the magnetic member.

20. The image stabilizing camera system of claim 19, wherein the electromagnetic member comprises a coil, the coil comprises an upper portion and a lower portion, and the magnetic member comprises an upper magnet spatially corresponding to the upper portion and a lower magnet spatially corresponding to the lower portion.

* * * * *